United States Patent [19]

Holtz

[11] 4,366,551
[45] Dec. 28, 1982

[54] ASSOCIATIVE MEMORY SEARCH SYSTEM

[76] Inventor: Klaus E. Holtz, 310 Guttenberg St., San Francisco, Calif. 94112

[21] Appl. No.: 87,280

[22] Filed: Oct. 22, 1979

Related U.S. Application Data

[63] Continuation of Ser. No. 809,569, Jun. 24, 1977, abandoned, which is a continuation of Ser. No. 750,953, Dec. 16, 1976, abandoned, which is a continuation-in-part of Ser. No. 587,069, Jun. 16, 1975, abandoned.

[51] Int. Cl.³ .............................................. G06F 7/22
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,056,111 | 9/1962 | Finkler et al. | 364/900 |
| 3,226,683 | 12/1965 | Gaffney, Jr. et al. | 364/900 |
| 3,349,375 | 10/1967 | Seeber et al. | 364/900 |
| 3,633,179 | 1/1972 | Reynolds | 364/900 |
| 3,800,286 | 3/1974 | Brown et al. | 364/900 |
| 3,916,387 | 10/1975 | Woodrum | 364/900 |

Primary Examiner—Gareth D. Shaw
Assistant Examiner—C. T. Bartz
Attorney, Agent, or Firm—John L. McGannon

[57] ABSTRACT

A knowledge storage and retrieval method is performed to result in a single address number of a storage region which represents a large quantity of information. A first character of a data sequence and a starting number are directed into a two-position buffer to form an input matrix. The storage locations of the storage region are addressed to see if the matrix is found in the storage region. If the matrix is found, the address number of the storage location of the storage region at which it is found is then stored in the second position of the buffer region. Then the next data character is directed into the first position of the buffer region and the searching step is repeated. If the matrix in the buffer region is not found in the storage region, the matrix is stored in a free storage location of the storage region and the address number of the free storage location is directed into the second position of the buffer. The next data character is moved into the first position and the searching step is repeated. Eventually, all of the data characters of a data sequence will be stored and the address number representing a storage location of the last-to-be stored data character will represent all of the data characters of the data sequence that were stored.

7 Claims, 16 Drawing Figures

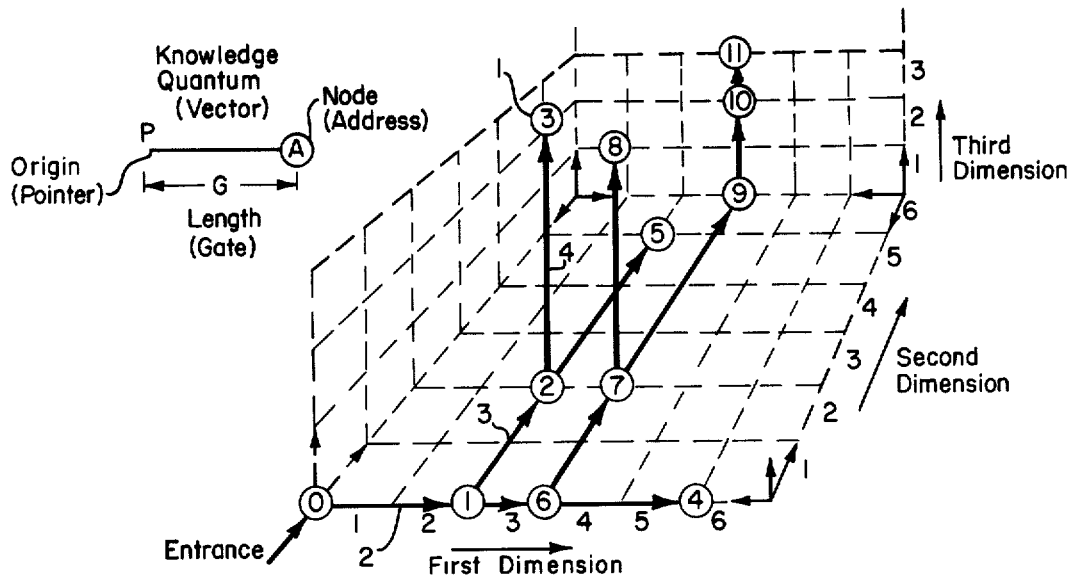
FIG. 1
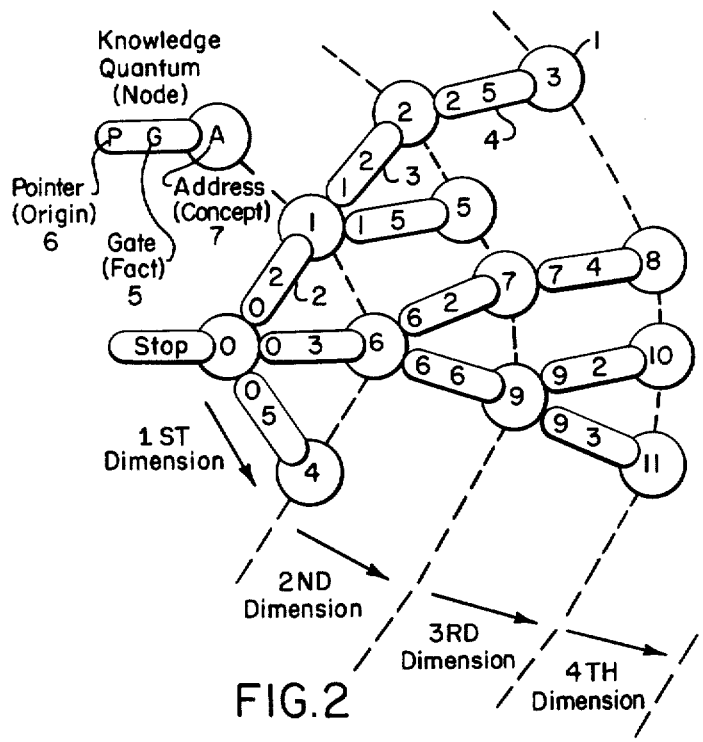
FIG. 2
FIG. 3

DATA COMPRESSION AND ENCRYPTOGRAPHIC DEVICE

PATTERN TRANSLATION DEVICE

LANGUGE TRANSLATION DEVICE

ASSOCIATIVE MEMORY SEARCH SYSTEM

This is a continuation of application Ser. No. 809,569, filed June 24, 1977, now abandoned, which is a continuation-in-part of application Ser. No. 750,953, filed Dec. 16, 1976, now abandoned, application Ser. No. 750,953 being continuation of application Ser. No. 587,069, filed June 16, 1975, now abandoned.

BACKGROUND OF THE INVENTION

Because "knowledge processing" is a new concept unique to this computer a lengthy theoretical introduction is deemed necessary. It will explain through "five laws" exactly what knowledge consists of and how it may be manipulated in electronic computers. The five laws may also be applicable to the human brain but the algorithm and implementations introduced here are different from the human brain and may only lead to similar results by widely different means.

The practical apparatus resulting from the technique are useful for self-learning devices, data compression, encryptography, pattern recognition and filtering, pattern sorting and merging, pattern translation, language translation and self-organizing artificial sense organs. The technique may lead to self-learning intelligent robots as well as to large computers containing and accumulating any kind of human knowledge.

The following five laws of "knowledge processing" will define the nature and dynamics of "knowledge" and show a way in which it may be stored in digital memory devices. Knowledge as a physical entity follows specialized rules of common principles which are included in brackets for further understanding. The actual mathematical device to accomplish a certain task will be described later in "the infinite dimensional networks".

Law 1

"Every concept may be specified like a point in multi-dimensional space". (Every object is at any one time in balance with all the forces acting upon it).

This law provides the basic insight of how "concepts" relate in our world. A concept is anything we can name or identify such as physical objects, relationships, persons, machines or abstract ideas. Since concepts are only rarely truly existing we have to distinguish between "concepts" and "objects". The concept ROSE for example specifies an abstract idea of what we perceive to be the essence of a ROSE. It does not refer to any actually existing ROSE.

We can imagine all concepts in our world to be like points in multi-dimensional space which individual locations can be accurately determined and which can be related to other points in space representing other concepts. It is emphasized here that this only describes a mathematical means of achieving a result. It does not require or imply the actual existence of "multi-dimensional space".

Law 2.

"Knowledge is defining concepts and their interrelationships". (The behavior of an object is determined by the forces acting upon it in space and time).

This law defines the term "knowledge" as used in this disclosure. The quantity "knowledge" is accumulated by defining concepts more and more accurately. In knowledge processing computers it is the process of defining the point each concept represents more accurately in multi-dimensional space. The relationships of concepts toward each other also represent knowledge.

For example, more knowledge of the concept ROSE is gained by defining it more accurately as SMALL, PINK, ROSE. The ROSE also relates to other flowers and bugs in the garden ecology. Defining this relationship also constitutes knowledge.

Law 3.

"A quantum increment of knowledge is a fact related to a concept which changes that concept to a different concept". (A force acting upon an object will change it to a differently behaving object).

This law provides a means to accurately measure the quantity knowledge and to store it in digital memory devices. A quantum of knowledge is a fact related to a certain concept which changes the concept to a more closely defined different concept.

For example, the concept ROSE is changed by the additional fact of its color RED to a different more closely specified concept RED ROSE.

Law 4.

"Only a few of the infinitely possible concepts exist in the real world. Every possible concept must, however, have a means of becoming real". (Even though an infinite variety of forces could act upon an object only a few will do so at any one time).

Fortunately the world in which we live is very limited in its variety. A knowledge processing computer may deal only with actually existing concepts and may ignore all merely possible concepts.

For example, an almost infinite number of possible English words could be assembled from the 26 letters of the alphabet, but only a few thousand words are used in common language. Every possible combination of letters could, however, lead to a new word in the future.

Law 5.

Established knowledge excludes redundant knowledge. (An identical history of forces acting upon an object will lead to identical results).

"Knowledge" unlike "data" is exclusive and will inhibit the learning of like knowledge. A knowledge processing computer will inhibit the storing of redundant knowledge and store each identical knowledge quantum only once.

For example, a human being if presented with a new fact will learn that fact to increase his knowledge. If presented with the same fact again he will recognize it but not learn it again. A knowledge quantum once learned must never be learned again unless a memory device is faulty and keeps forgetting.

The word "learning" is hereafter defined to mean the storing or accumulation of "new" knowledge.

SUMMARY OF THE INVENTION

Infinite Dimensional Networks

The five laws of knowledge processing define the basic laws under which this new computer will operate. The actual operation of the computer is based on the concept of the "infinite dimensional networks" which will be explained now. The term "infinite" solely refers to the mathematical concept which is indeed not limited. Practical computers must always operate with finite resources and the term "multi-dimensional networks" may be more appropriate. The term "infinite dimensional network" will nevertheless be used in the following test even in practical systems descriptions.

The infinite dimensional network is a mathematical imaginary entity which is useful for specifying and relating points in multi-dimensional space. It is the basic tool of knowledge processing. There are four distinct network classes discovered by the inventor thus far but only one will be treated in detail in this introduction. The network classes are named learning network, multipolar networks, parallel networks and unfolding networks.

The primary object of the present invention is to provide a method and apparatus for processing knowledge instead of data as in conventional computers wherein the invention provides a self-learning system and requires no programming or human supervision of its internal functions except for certain micro-routines to implement an algorithm in conventional microprocessors.

Other objects of this invention will become apparent as the following specification progresses, reference being had to the accompanying drawings for use in illustrating the concepts of the present invention.

IN THE DRAWINGS

FIG. 1 is a schematic view of a three-dimensional space showing how points in space can define knowledge quanta;

FIG. 2 is a schematic diagram defining a transform of the information of FIG. 1;

FIG. 3 is a graphic listing of the information stored by the network shown schematically in FIGS. 1 and 2;

Figure 4:
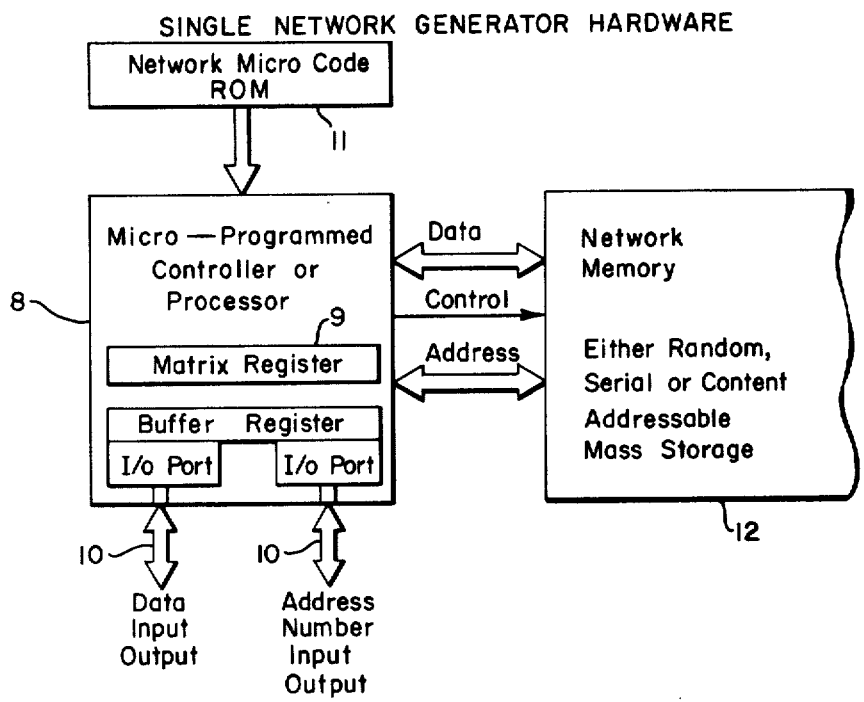
FIG. 4 is a block diagram of an infinite dimensional network generator apparatus forming one aspect of the present invention.

In order to clarify the concept a network will be shown in three different ways at which each is a transform from the previous network. Only the final stored network in FIG. 3 is really part of this invention. The networks shown in FIG. 1 and FIG. 2 are only fanciful diagrams useful for explaining the concept.

DETAILED DESCRIPTION OF THE INVENTION

Turning now to FIG. 1 which shows a three dimensional network which is all that can be illustrated on paper, this network is used to define certain points in one, two and three dimensional space. It consists of numbered nodes and dimensional vectors. Each numbered node in the network is unique and represents a point in space which position is precisely known. The nodes are identified by separate numbers so that no two nodes will have the same number.

To identify a certain point in three dimensional space such as node 3 indicated at 1, one requires three vectors which are two steps in the first dimension indicated at 2, two steps in the second dimension indicated at 3, and five steps in the third dimension indicated at 4.

If one looks at this from another point of view, one may ask how many increments of knowledge are required to identify the location of node 3. The answer is three quantums in which each quantum is a fact (vector length) associated with a previously defined point in space (concept).

Each vector originates from a previously defined node. A quantum of knowledge is the vector length and the number of the originating node. The precise definition of a quantum of knowledge was previously described in Law 3 of knowledge processing. A knowledge quantum is therefore a fact (vector length) associated with a concept (previous node) which leads to another concept (next node).

FIG. 1 shows how points in space can be defined by quantums of knowledge.

Turning now to FIG. 2 which is a transform from FIG. 1, this FIG. 2 contains all the information of FIG. 1, but re-arranged in a more convenient way. Instead of showing the vectors in their physical length and position, they are replaced by so-called GATE 5 values. The GATE value is in FIG. 2 identical to the vector length.

The term GATE is here defined as an input condition which must be met in order to cross through that branch to the next node. It is identical to the input "fact" or input "data". An important law of infinite dimensional networks is that even though each network node may sprout an unlimited number of branches each gate value from the same node must be unique. No two branches from the same node may have the same GATE. This was previously defined by Law 5 of knowledge processing.

A POINTER 6 is also introduced here. A POINTER defines the associated concept in a knowledge quantum. In FIG. 2 it defines the node from which the branch originates.

A quantum of knowledge is in FIG. 2 a GATE 5 value and a POINTER 6 value which leads to a new node. The numbers to identify each node are henceforth called ADDRESS 7 numbers. Each ADDRESS defines a concept as a unique point in space. As apparent, FIG. 2 may sprout into additional dimensions if required. As in FIG. 1 the unique point 3 may still be defined by its three vectors (2, 3, 4).

Turning now to FIG. 3 which shows the final transform of the network, its network character is no longer readily apparent but it in fact contains the exact information from FIG. 1 and FIG. 2. This is the kind of infinite dimensional network generated by the following processes and algorithms which will all result in this kind of stored network. The network in FIG. 3 was derived by the simple disassembly of the networks in FIG. 2 into its individual node and storing them according to their ADDRESS numbers in a digital memory device. This network is suitable for computer processing. The unique node (ADDRESS) 3 indicated 1, may again be identified by its three input vectors, 2, 2, 5. A quantum of knowledge is in FIG. 3 a GATE and a POINTER value stored in a unique ADDRESS location.

The foregoing discussion was only intended to clarify the meaning of the infinite dimensional network and the knowledge quantum. There are many variations of this basic netowrk which will be generated by simple computer algorithms discussed in the next chapter. The main features of infinite dimensional networks are:

(1) Define input patterns of arbitrary length and complexity (meaning concepts) as single ADDRESS numbers (points in space). See Law 1.

(2) Store knowledge which consists of the definition of points (concepts) in multi-dimensional space. See Law 2.

(3) All knowledge quantums are unique and will not repeat in the same network. See Law 5.

(4) All networks are stored in digital memory devices and have no theoretical limit on size and dimension.

(5) All networks are generated automatically by computer algorithms in a memory device without human programming or supervision.

HARDWARE IMPLEMENTATION

An infinite dimensional network, knowledge processing computer can be built from conventional electronic devices such as micro-processors and digital storage. Specialized hardware will improve performance and speed but will not affect the basic method employed.

A very simple infinite dimensional network generator apparatus is shown in FIG. 4. It consists mainly of a micro-programmed controller or processor 8 which must be able to execute the required network algorithms. Special features required are an internal MATRIX REGISTER 9 and input-output port facilities for data and ADDRESS 10. The MATRIX REGISTER is used to hold the GATE and POINTER values during network building process. It is an internal working register of the micro-processor which is of special significance.

The micro-processor is controlled by the network algorithms reduced to programming steps and stored in a small separate memory device 11.

The infinite dimensional network will be generated by the micro-processor and stored in an external mass-memory device 12 such as magnetic bubble, magnetic disk or laser memory. Any presently available memory devive may be used including random access, serial access or content addressable memory devices. Access method will affect system speed but not its basic operating principle.

Figure 5:
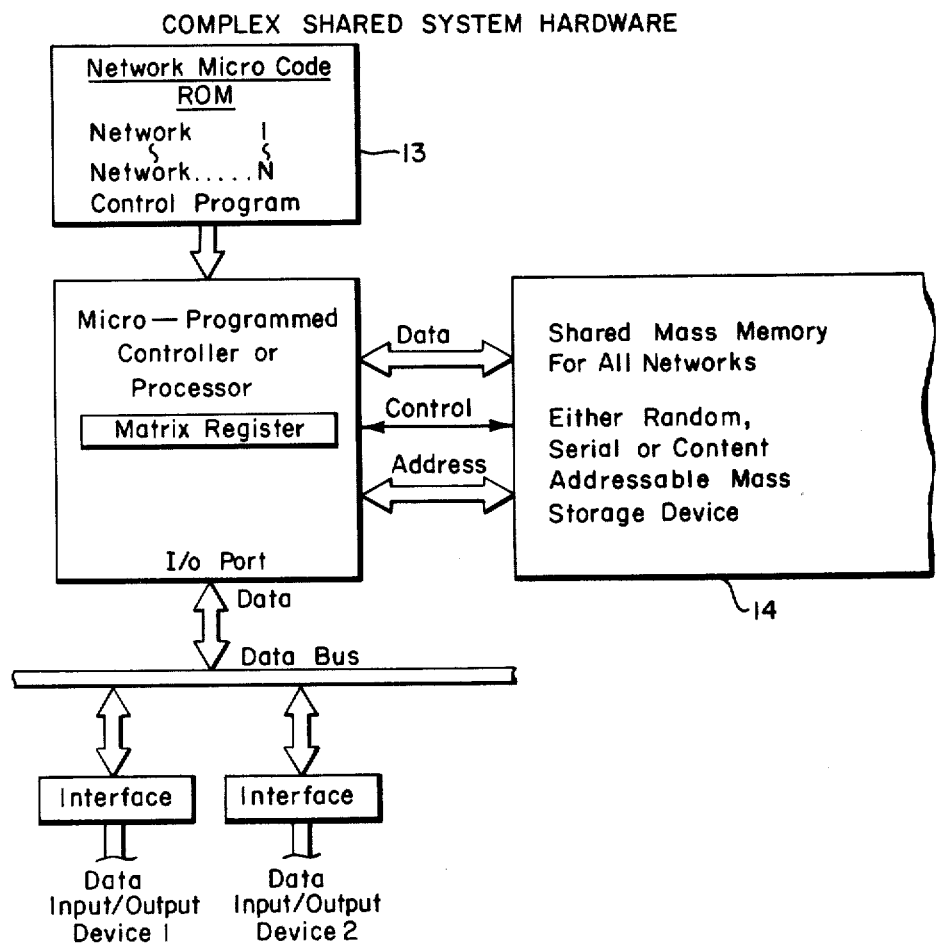
FIG. 5 is a view similar to FIG. 4 but showing a more complex system having several network generators.

A more complex system consisting of several networks may share the hardware as shown in FIG. 5. The micro-code memory 13 may contain the algorithms of several networks and some kind of simple control program. The shared mass memory 14 may contain several networks interleaved in the same memory space.

A LEARNING NETWORK

This section will explain the process and steps to generate a simple learning network. The data input used in the sample are simple (ASCII) written characters. In practical systems there is, however, no restriction on the kind of data input. Here are some examples of possible data inputs and their sources.

(1) Written text input from typewriter or keyboard.

(2) Digitized analog data inputs from sensors.

(3) Numerical pulse trains such as derived from motion transducers in a robot's arm.

(4) Serialized video input pattern from TV cameras.

(5) Coded sound pattern derived from audio-input.

The primary functions of a learning network are:

(1) To convert any input pattern of arbitrary length and complexity into a single ADDRESS number.

(2) To generate a unique ADDRESS number for each previously learned unique input pattern.

(3) To expand the network automatically when new patterns are encountered.

(4) To retrieve the entire input pattern from the single ADDRESS number.

Figure 6:
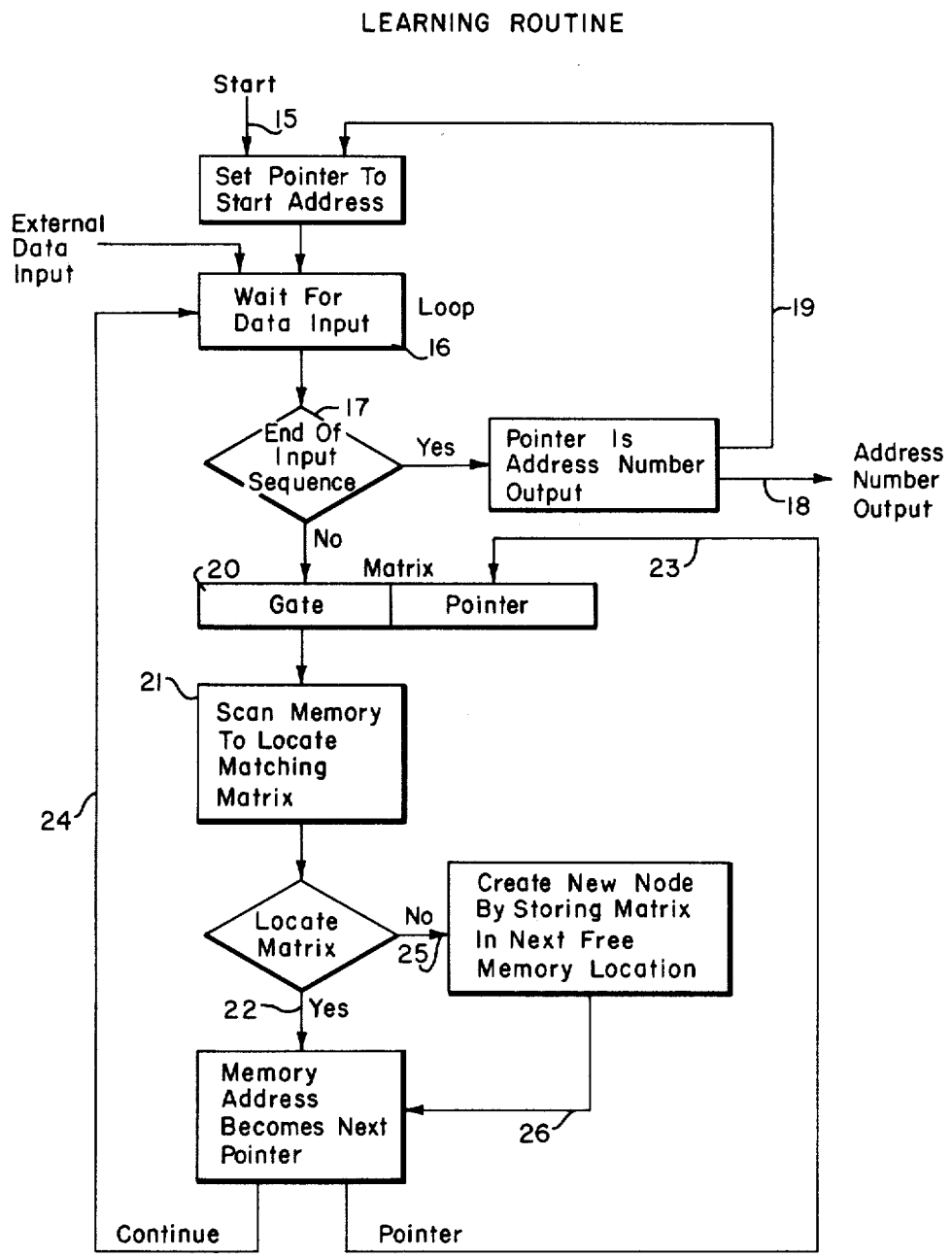
FIG. 6 is a flow diagram of the network-building algorithm used to assemble a learning network in a digital memory device.

Turning to FIG. 6 which shows a flow diagram of the network building algorithm which will assemble a learning network in a digital memory device from the supplied input data. Even though these operations could be performed by a human being with nothing more than paper and pencil it still represents a significant improvement in the art if automated by an electronic circuit. Electronic computers could absorb the knowledge of a human lifetime within hours and do so with vastly improved accuracy and reliability.

The process described here is genuine learning. Where learning is defined as the absorption of new knowledge and knowledge as defined earlier as defining concepts and their interrelationships.

The following text will closely follow the diagram in FIG. 6 to explain each step in more detail.

| Label | Operation |
| --- | --- |
| START | The electronic control circuit will initialize its internal |
| 15 | MATRIX REGISTER by setting its POINTER value to the starting node of the network. In most cases this will be ADDRESS 0 but it may be any ADDRESS because several networks may be interleaved in the same memory device. A special STOP code must be stored in the memory device at the location specified by the starting ADDRESS. The code is arbitrary but must be recognizable by the controlling circuit. |
| LOOP 16 | The controlling circuit (micro-processor) will wait for the arrival of data values from the outside world. The data value must be a digital number which may be of any format such as written (ASCII) characters. |
| 17 | The arriving character is first examined to determine if it represents an END code which indicates the end of the input sequence. For example, in written text it would be characters like space, comma, full stop, question mark, etc. If it is one of these END codes the current POINTER value in the MATRIX REGISTER is the ADDRESS (18) number which is the final product of this procedure. The program would return to label START 19. If it is not an END code the input character is loaded into the GATE portion of the MATRIX REGISTER 20. |
| 21 | The controlling circuit will search the network memory device to determine if any memory ADDRESS location contains a pattern which is identical to the current content of the MATRIX REGISTER. The memory search may be performed by sequentially scanning the memory locations or by direct access to a content addressable memory device. |

-continued

The scanning sequence is in forward direction only and one complete scan of the entire memory device is always sufficient to recognize or learn the entire input sequence.
If a memory location is found which content matches the current content of the MATRIX REGISTER 22 the ADDRESS of that memory location is loaded into the POINTER portion of the MATRIX REGISTER 23. The operation sequence would branch back to Label LOOP 24.
If a matching pattern is not found in the memory device 25 a new network node must be created. This is accomplished by storing the present content of the MATRIX REGISTER in the next free memory location. This may be the next memory location on the end of the presently used portion of the memory field. The ADDRESS 26 of that memory location is then loaded into the POINTER portion of the MATRIX REGISTER 23 and the operation sequence will branch back to label LOOP 24.

Figure 7:
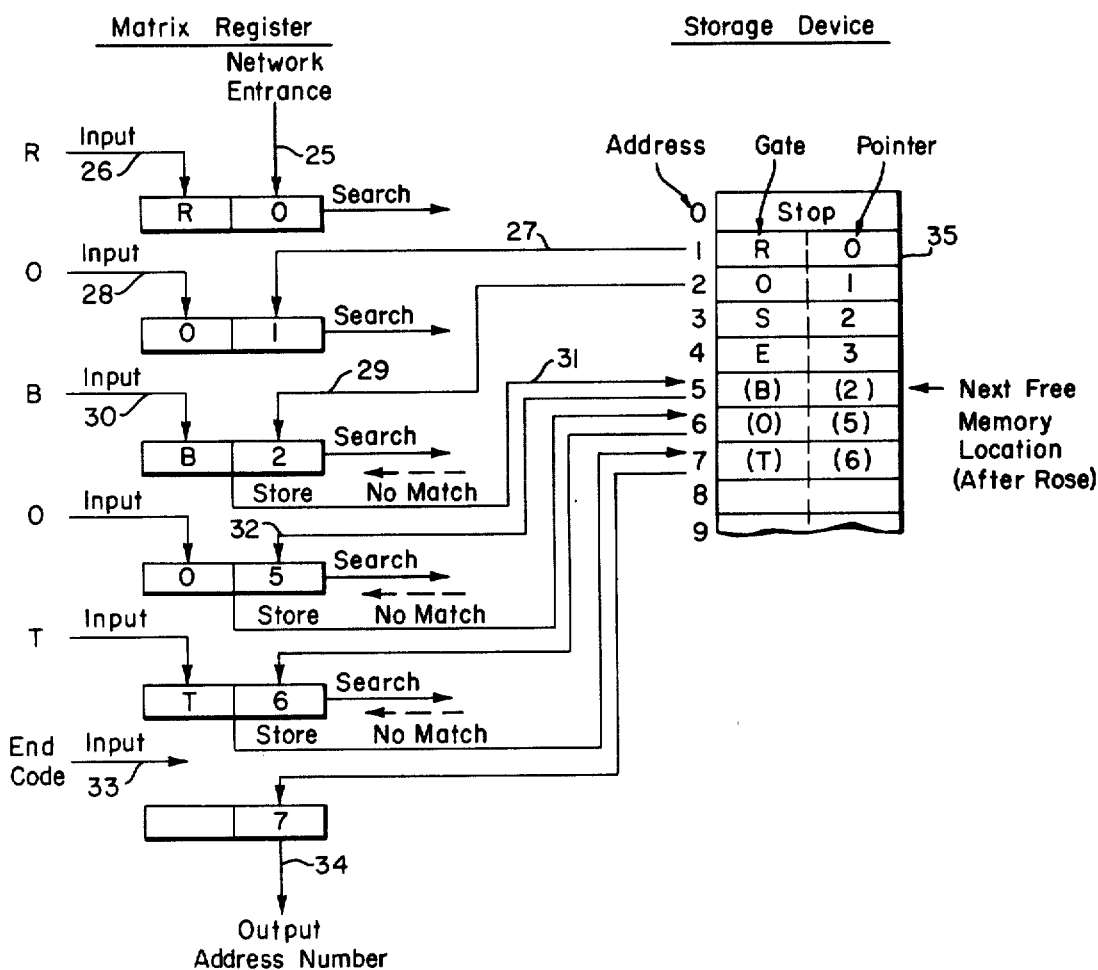
FIG. 7 is a block diagram showing the steps taken to generate a network.

As an example, the following text together with FIG. 7 will show how the network is generated from the steps in the preceding process. It will be assumed here that the word ROSE was previously learned and the word ROBOT is not yet learned. The example shows how the second word ROBOT is learned.

25 The matrix register originally contains the POINTER "0" since the network extrance is in the case ADDRESS 0.
26 The first input character R is loaded into the GATE portion of the MATRIX register.
27 A scan of the memory device determines that a pattern of GATE R and POINTER 0 is stored in ADDRESS 1. ADDRESS 1 is loaded into the POINTER portion of the MATRIX register and the circuits await the arrival of the next character.
28 The next character GATE O and POINTER 1 are located in the memory device ADDRESS 2.
29 ADDRESS 2 is loaded into the POINTER portion of the MATRIX register.
30 The next character GATE B and POINTER 2 cannot be found in the memory device. The content of the MATRIX register containing GATE B and POINTER 2 is stored in the next free available ADDRESS location in the memory device.
31 In this example it is ADDRESS 5. A new node is therewith created and the POINTER value in the MATRIX register is loaded with ADDRESS 5.
32 The next two characters O and T are similarly used to create new nodes at the end of the currently used memory field. It is not really requrired to search the memory field since once storage is initiated no matching matrix patterns in the memory will be found.
33 The END code input indicates that the present POINTER value is the ADDRESS output number which is the final result of this procedure.
34 Address number 7 is the output for the entire word ROBOT. This ADDRESS 7 totally identified the word ROBOT and any future input of that word will always lead to ADDRESS 7. Any unique input word will generate a unique ADDRESS number. A word once learned will be recognized but never learned again.
The network will expand indefinitely to absorb new words but since more and more patterns are already stored the memory requirements for subsequent words will decrease until memory requirement will almost saturate.

The previous description should explain the steps to assemble a learning network and the automatic process to expand the network to absorb new input patterns. The resulting stored infinite dimensional network is also shown. (35).

GATE and POINTER numbers consist of digital (binary) numbers which are stored in a common memory device.

WORD RETRIEVAL FROM A LEARNING NETWORK

A learning network converts any data input sequence of any arbitrary length into a single ADDRESS number. The ADDRESS number totally identifies each input sequence and may be used to retrieve it at a later time.

Figure 8:
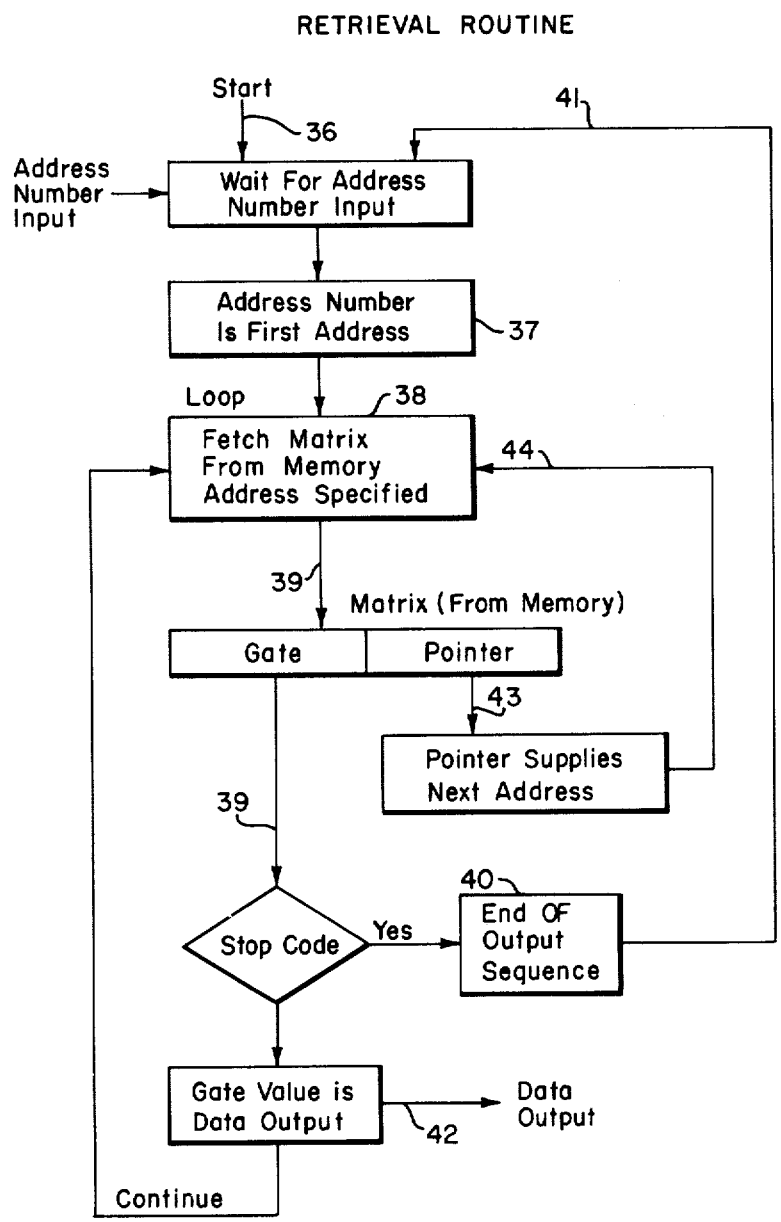
FIG. 8 is a flow chart for a learning network in which a data input sequence is converted into a single address number.

Turning now to FIG. 8 which shows a flow chart of this process which will now be explained in detail.

| Label | Operation |
|---|---|
| START 36 | The control circuit waits for the input of the ADDRESS number which is supplied either direct or is received from previous network. In the example it was ADDRESS number 4 for ROSE and 7 for ROBOT. |
| 37 | This ADDRESS number is used for the first operation |
| LOOP 38 | The control circuit will fetch the content of the memory location specified by the ADDRESS number. The memory word is fetched or read from memory device and loaded into the MATRIX register |
| 39 | The MATRIX register is examined to determine if it contains the STOP code which denotes the network entrance. The control circuit may alternately hold the ADDRESS of the network entrance and terminate the sequence when this ADDRESS is detected. |
| 40 | If either of these conditions is true, the sequence is terminated because the whole output pattern is retrieved at this time. The program would branch back to Label START. (41) The MATRIX register now contains the GATE and POINTER values which were previously fetched from the memory device. The GATE portion of the MATRIX register contains the output data which is sent out to some external output device such as a typewriter. (42) The POINTER portion of the MATRIX register 43 contains the ADDRESS of the next word in the memory device which contains the next output characacter and another POINTER. The ADDRESS number is noted and the program branches back to Label LOOP. (44) |

The above procedure will retrieve the entire data sequence from the ADDRESS number but in reverse order. In the example ADDRESS number 4 would result in ESOR and ADDRESS number 7 in TOBOR. This may easily be remedied by adding a first-in-last-out buffer in the control circuit.

Figure 9:
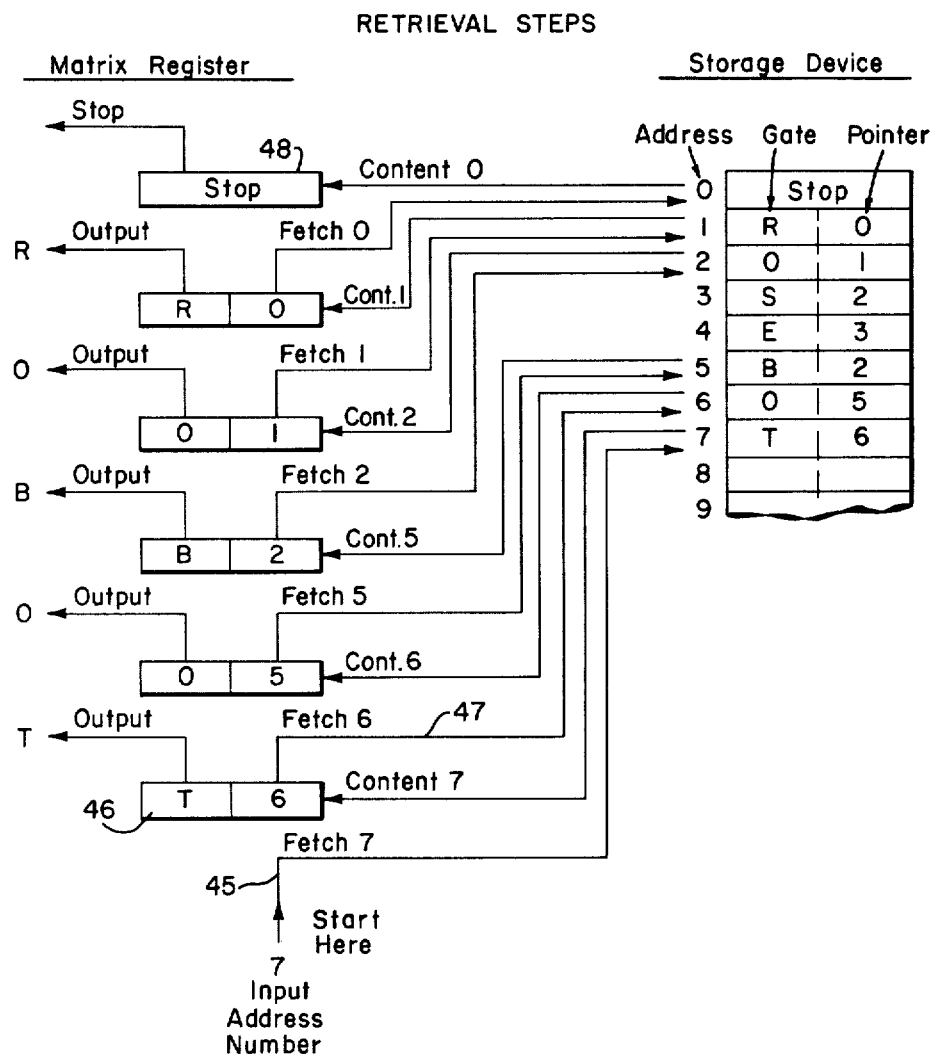
FIG. 9 is a view similar to FIG. 7 but illustrating the steps of retrieving information from a generated network.

The following text and FIG. 9 will describe as an example of how the word ROBOT is retrieved from the network in FIG. 7 (35) by its ADDRESS number 7.

| (45) | The input ADDRESS number 7 is used to address the memory device and to read or fetch the memory content of ADDRESS 7. The content of this memory location is loaded into the MATRIX register. The MATRIX register now contains a GATE value T (46) and a POINTER value 6. The GATE character T is the last letter of the word ROBOT. It is sent to the output device. The POINTER portion of the MATRIX register contains the ADDRESS of the next location in the memory device. In the example the next memory device ADDRESS location 6 is fetched and loaded into the MATRIX register. (47) The MATRIX register now contains the next (GATE) character O and the next POINTER 5. This process is repeated until ADDRESS 0 is reached (48). The sequence is then |

-continued complete and the entire word ROBOT should
be retrieved in reverse order.

The above description should explain how a data pattern sequence once stored in a learning network can be retrieved from its unique ADDRESS number.

BI-POLAR NETWORKS

These networks perform the associative function by connecting nodes in separate networks. In most practical systems an input pattern must be connected to some output pattern such as Question to Answer, Input to Output, command to execution, etc. This connection function is implemented by the multi-polar networks which connect certain nodes in other networks.

Figure 10:
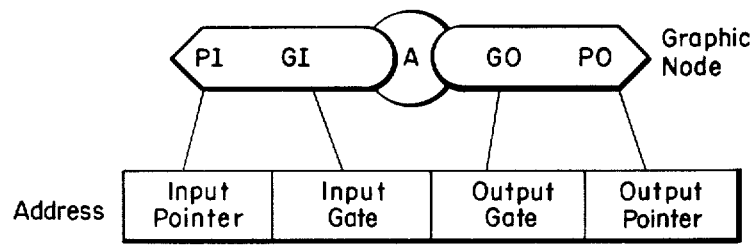
FIG. 10 is a block diagram showing a bi-polar network.

FIG. 10 shows a standard BI-POLAR network node. The input POINTER PI represents a node (ADDRESS) in some input network. As such it represents an input such as a question encoded into a single ADDRESS number.

The INPUT GATE GI represents some system condition which is connected with the selection of the output response. It is a complex pattern which is converted into a single ADDRESS number by a separate status network. In very simple systems the INPUT GATE may not be required. As an example of the functioning of the INPUT GATE consider how the answer to a question given to a human is dependent on such emotional states as hurry, rage, emergency, talking to a child, a friend or stranger. A computer must similarly select its response according to its system conditions.

The OUTPUT GATE GO represents a factor in selecting an output sequence depending on the condition of the output device. It is a complex pattern encoded into a single address number by a separate output status network. The OUTPUT GATE may not be required in very simple systems. As an example, consider how a normal output sequence may be modified if the output device is not available or defective. Another alternate output sequence may then be selected.

The Output POINTER PO is a node (ADDRESS) in the output network which represents the desired output response. It is a single address number which was derived by encoding the complex output pattern as described in "A Learning Network". This number is subsequently used to retrieve the output pattern sequence as described in "Word Retrieval from a Learning Network".

The Bi-Polar Networks are distinct in that the node ADDRESS number is not directly used but serves only to guide the search and store operations of the memory device. As specified earlier, the relationships of concepts also constitute knowledge but no new concept is created in the process.

The terms INPUT POINTER and OUTPUT POINTER are used only for convenience. Their function may be reversed. For example, in an English-German language translation device, an English input would result in a German output. A German input would result in an English output using the same networks.

Figure 11:
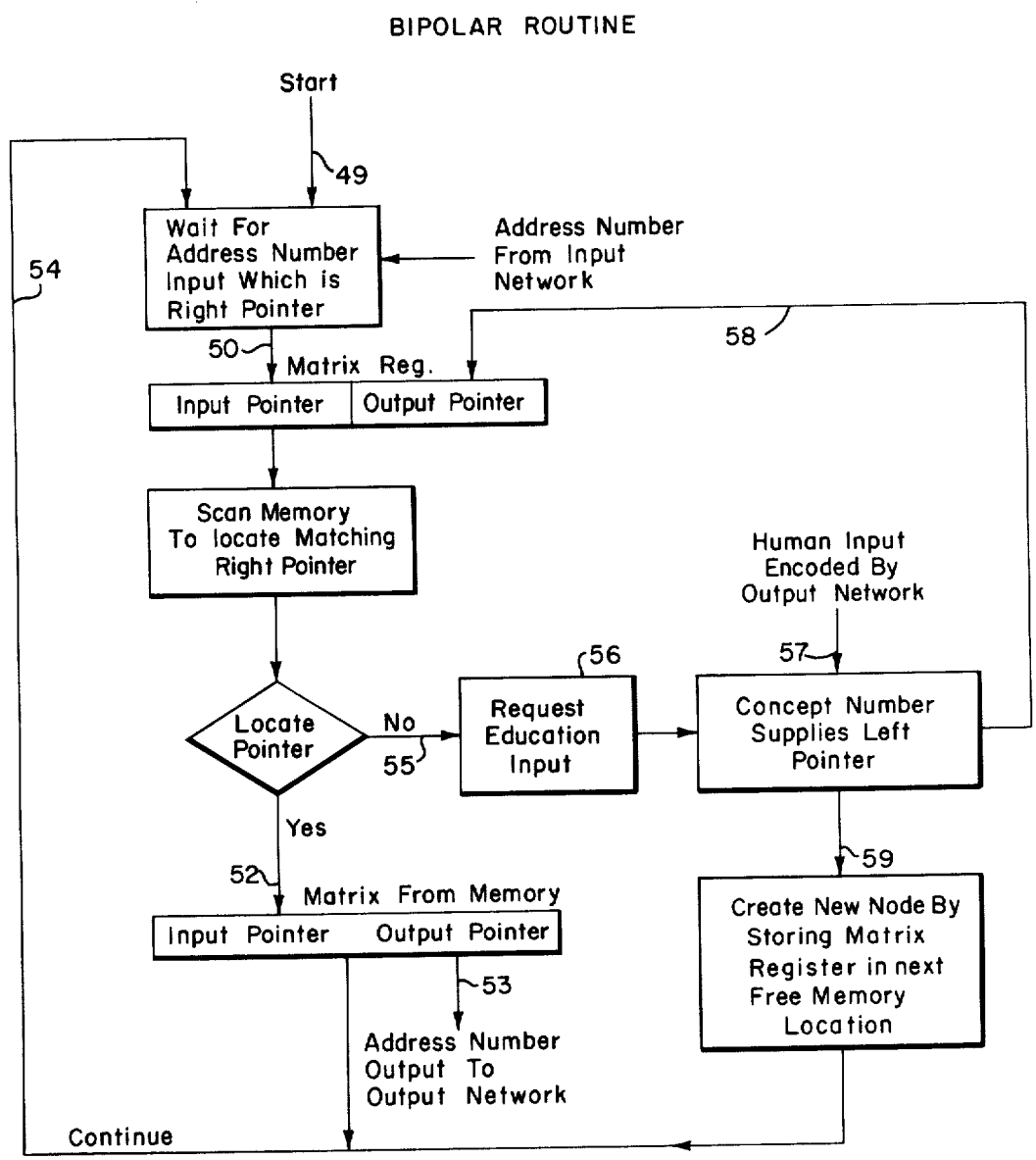
FIG. 11 is a flow chart for a simple bi-polar network having no input or output gate.

The following procedure may illustrate the functioning of a Bi-Polar network. Turning now to FIG. 11 which shows the flow chart for a simple Bi-Polar network without input or output GATE.

| Label | Operation |
|---|---|
| START 49 | Wait for the INPUT POINTER input from a previous network. This represents the input sequence such as Question or command. |
| 50 | Load INPUT POINTER into Matrix register. (Also load INPUT GATE and OUTPUT GATE if required into the Matrix register). |
| 51 | Search network memory to find a memory word which matches the INPUT POINTER. (INPUT GATE and OUTPUT GATE) in the Matrix register. |
| 52 | If such word is located supply the OUTPUT POINTER from that memory word to the output network generator 53. The OUTPUT POINTER represents the desired output Answer or Execution sequence. Return the program to Label START 54. |
| 55 | If such word is not located in the network memory signal for human educational input 56. The desired output response is supplied by a human teacher 57 and encoded by the output network into a single ADDRESS number as explained in "A Learning Network". This ADDRESS number is then loaded into the OUTPUT POINTER field of the Matrix register 58. The Matrix register is stored in the next free |
| memory location in the network memory 59 to | create a new node. The program returns to Label START 54. |

The network described so far is a Bi-Polar network because it only contains two pointers. Additional pointers may be provided at which any pointer may be the input while the other pointers provide the output.

PARALLEL NETWORKS

The function of a parallel network is to convert a complex parallel input pattern into a single ADDRESS number. A biological example is the human eye in which a complex pattern such as a rose is converted into a single firing brain cell.

The parallel network is distinct from the other mentioned networks in that the POINTER value is absent or implied. Each network layer has a pointer value implied by its location. Like all the other networks it will assemble itself from the supplied input data.

Figure 12:
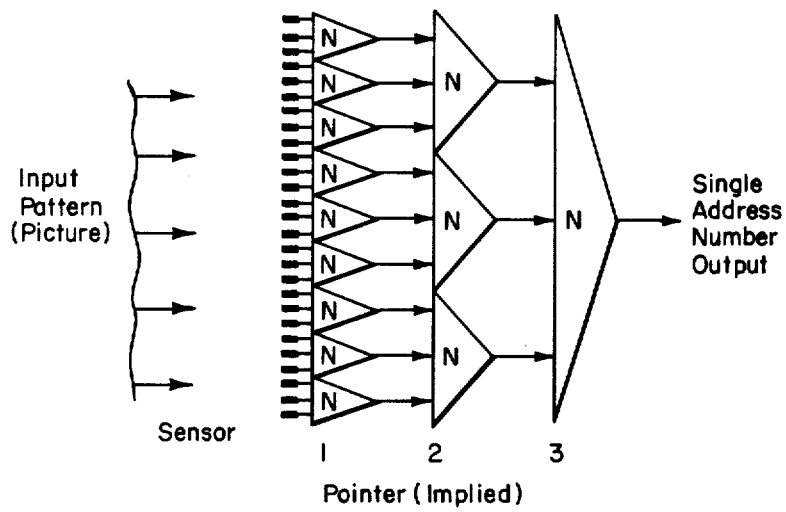
FIG. 12 is a schematic diagram of a three-value network to show a network building process.
Figure 12:
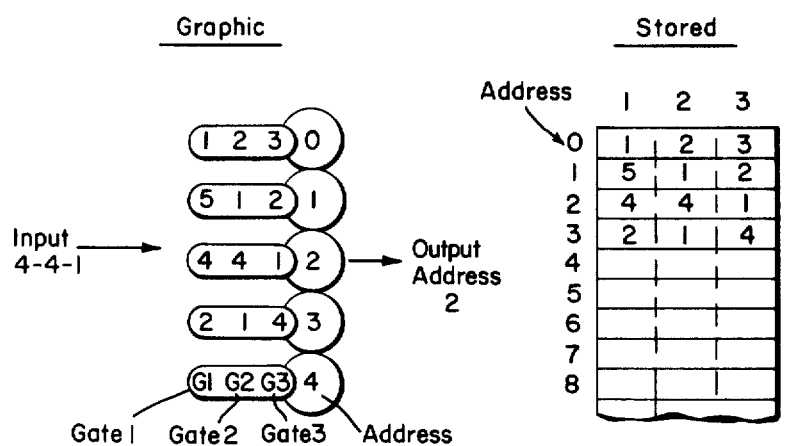

FIG. 12 shows a three value network to illustrate the network building process. The algorithm, however, could operate with any number of values and the three value network is only an example.

Each of the thirteen separate network generators operates in the same way. In a practical system there is no need to implement thirteen separate generators each with its own network memory such as in FIG. 4. A single physical network generator could execute each of the thirteen networks in sequence and store all thirteen networks in a shared mass memory such as shown in FIG. 5.

The three input lines to each network generator each supply a separate ADDRESS number input. This ADDRESS number was derived in the previous layer of networks or from input sensors. The network building process stores these three input numbers as nodes in the network memory in such a way that each node contains a unique pattern. The network will expand automatically to accommodate new input pattern in a ripple through fashion so that every input pattern will result in a single ADDRESS output number.

Figure 13:
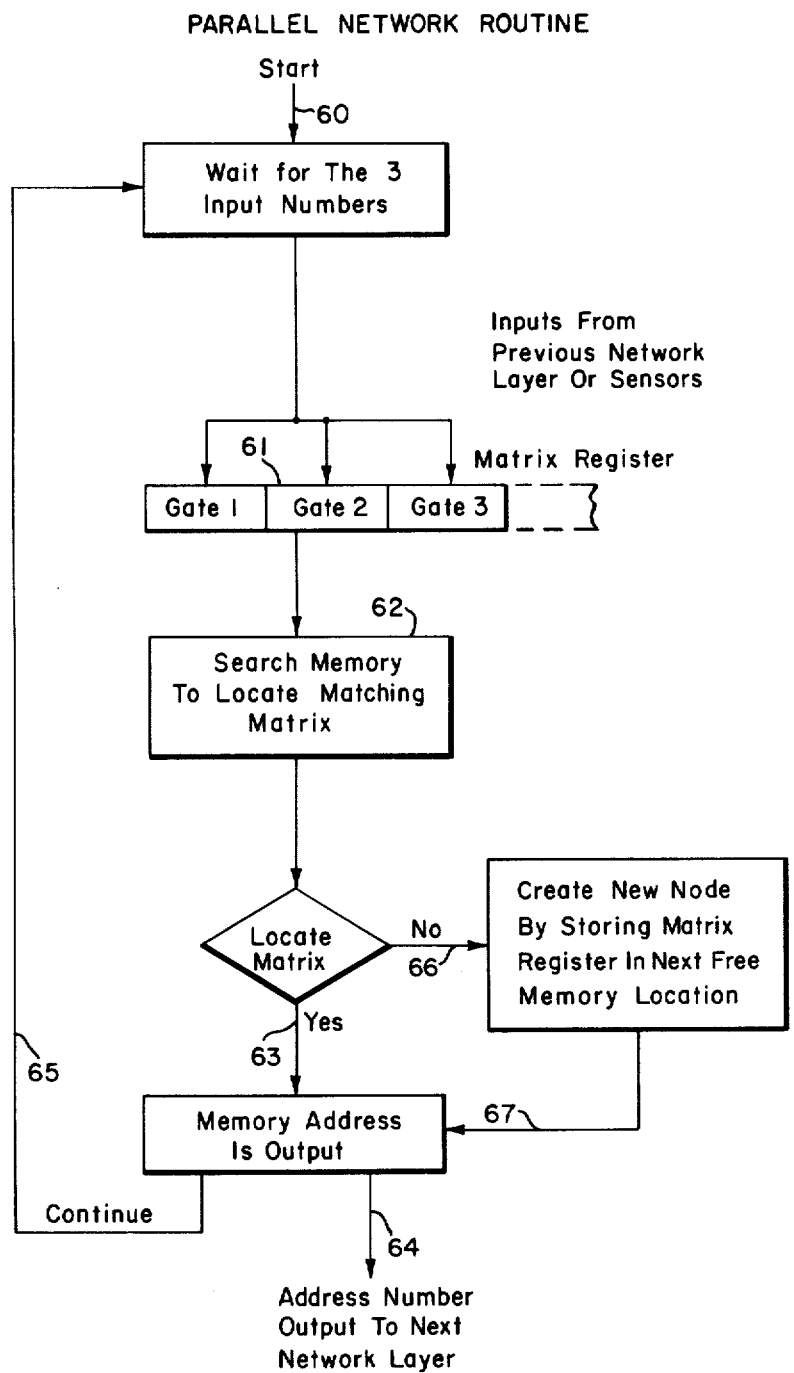
FIG. 13 is a flow chart defining an algorithm for generating a single parallel network.

Turning now to FIG. 13 which shows the algorithm to generate a single parallel network.

| Label | Operation |
| --- | --- |
| START 60 | Wait for the three input numnbers from the previous networks and buffer them in the MATRIX REGISTER 61. |
| 62 | Search the network memory to find a location in which the three input numbers are already stored. |
| 63 | If such a pattern is found supply the memory ADDRESS at which it was found as output to the next network layer 64. The program branch back to Label START 65. If such a pattern is not found (66) store the three input numbers in the next free memory location and supply that memory ADDRESS as output to the next layer 67. The program branch back to Label START 65. |

Like the previously described learning network the knowledge stored in a parallel network may be fully retrieved from the output ADDRESS number. By supplying the ADDRESS number as input to a network the original three input GATE patterns are retrieved by simply fetching the word from the supplied ADDRESS location.

The parallel network may be used for the automatic assembly of artificial sense organs such as eye or touch.

AN UNFOLDING NETWORK

This fourth so far discovered variation of the infinite dimensional network is mentioned only for reference. In this network each node (ADDRESS) will split into a pre-determined number of copies whose function is determined by its surrounding conditions (GATE). An example is the human body which will unfold from a single fertilized cell. Each cell (node) will split into two other cells (branches) which function is determined by it immediate surrounding (neighboring cell surfaces, hormones) as GATE and its developmental state (dimension, pointer). A single cell will therefore unfold into a multitude of other cells by an automatic pre-learned process (genes).

A SORTING, CRYPTOGRAPHIC AND DATA COMPRESSION DEVICE

Figure 14:
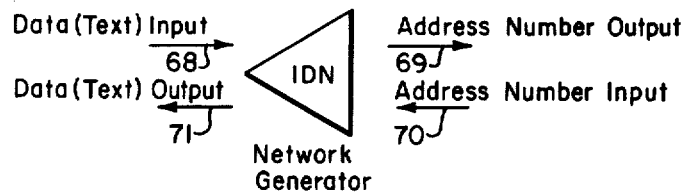
FIG. 14 is a schematic diagram of a sorting cryptographic and data compression system.

This device is illustrated in FIG. 14. This device consists of a single network generated by a circuit such as shown in FIG. 4 or FIG. 5.

The network is used to learn a multitude of input patterns such as written words. It converts every input pattern into a single ADDRESS number regardless of its complexity or length. The network will expand automatically to absorb new not previously learned data sequences. The procedure is identical as described under "A Learning Network".

The single ADDRESS number derived from the network generator is used in this practical system. The ADDRESS numbers are used later to retrieve the original pattern as described under "Word Retrieval from a Learning Network".

To facilitate operation, a multitude of input patterns is first learned by the network. This may be done by typing in some written test from a typewriter. Every new word is absorbed by the network which will expand as required. This process may for example be accomplished by typing in some random written text such as a novel or a dictionary. The same may be accomplished by connecting the network generator to a telegraph line which normally carried written text such as telegrams.

The network will absorb new patterns very rapidly at first but will slow its learning as more and more patterns are supplied more than once. At a sufficient interval of time most data patterns will be contained in the network. The network may, for example, contain most words in the English language and expand only very rarely to absorb new words. A complete vocabulary is not required for this application since missing words may be made-up by word fragments. The learning of new patterns would be disabled after the original eduction in most of the following applications.

A network prepared in such a way will provide a single output ADDRESS number for each input data pattern. The ADDRESS number may later be used to retrieve the original data sequence. Such a device has three features which are very useful for practical devices.

(1) Every previously learned data pattern is recognized but never stored again. This feature may be utilized to merge files such as customer lists in which each unique entry is stored just once. Another useful device could be a teaching device to teach correct typing. A word not previously learned would presumably be misspelled and cause an alarm. This feature would cause the recognition of previously stored patterns and filter out alien patterns. This may be used for security access control or the filtering of patterns such as earthquake waves or hearbeats to detect desired patterns and reject undesired patterns.

(2) Every network is internally unique and depends on the sequence of its original education. The sequence in which patterns are learned is arbitrary for each network. It may, therefore, be assumed that any two networks prepared by two different persons would not be identical since words would not be learned in the same sequence. The ADDRESS output number representing the input pattern would be different for each network. If, for example, a written communication would be confidential and an intercepted message would be almost impossible to decode. A confidential ADDRESS number communication can, however, be easily decoded into its original test by an authorized person in possession of an identical network. A network may be copied into an identical network by a memory dump from the original network. An automatic encryptographic device is herewith provided.

(3) Every input pattern is converted to a single ADDRESS number regardless of the length or complexity of the pattern. The ADDRESS number may then be used to retrieve the entire input pattern. The ADDRESS number may therefore be seen as representing the input pattern in highly compressed form. If a text file consisting of written English words, for example, would be converted into ADDRESS numbers before storage or transmission over long distances, a large savings in storage or transmission cost could be realized. The original text may be retrieved later without any sacrifice in accuracy.

The following procedure may be used to explain the functioning of the devices.

| Label | Operation |
| --- | --- |
| EDUCATION | Educate the device with an adequate number of input patterns by a process described by "A Learning Network". |

-continued

| Label | Operation |
|---|---|
| | Disable the learning of additional patterns by software or hardware means. |
| START | Wait for input pattern sequence. |
| 68 | Convert input pattern sequence into a single ADDRESS number by a process described by "A Learning Network" but without additional storage. |
| 69 | If entire input sequence is contained in memory supply the ADDRESS number as output of the device. If the input sequence is not contained in the memory and new nodes would be required if storage were not disabled do the following according to the application. Sound warning (misspelled word, alien pattern). Go back to Label START. Supply last recognized ADDRESS number as output and go back to Label START (The missing pattern is made-up by word fragments) |
| RETRIEVAL 70 | Wait for ADDRESS number input. |
| 71 | Re-generate original input pattern from ADDRESS number by a process described by "Word Retrieval from a Learning Network". Go back to Label RETRIEVAL. |

A PATTERN TRANSLATION DEVICE

Figure 15:
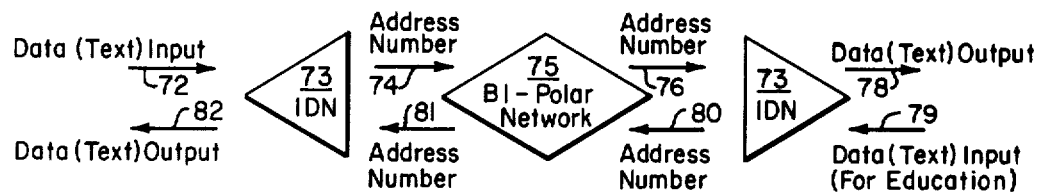
FIG. 15 is a view similar to FIG. 14 but showing a pattern translation device.

A pattern translation device such as shown in FIG. 15 could be designed with hardware such as shown in FIGS. 4 and 5. It is useful for converting a complex input pattern sequence into a pre-learned output pattern sequence. Its application could be for word-for-word language translation or code conversion systems. It could also be used to store and accumulate any kind of knowledge such as giving pre-learned answers to pre-learned questions.

Turning now to FIG. 15 for a description of the functioning of this device.

An input such as a question or a command pattern is supplied to the system 72 such as from a typewriter. A learning network generator 73 will convert the complex input pattern into a single ADDRESS number 74 in a process described under "A Learning Network". This ADDRESS number 74 is then supplied as input to a Bi-polar Network generator 75 which will supply an output ADDRESS number 76 if the output (Answer, execution) was previously learned by the system. The process is as described under "Bi-Polar Networks". The output ADDRESS number 76 is then supplied as input to an output network generator 77. This generator will retrieve the entire output pattern 78 from the input ADDRESS number 76 by a process described under "Word Retrieval from a Learning Network". The output pattern 78 represents the desired pre-learned output response such as the answer to the input question. If the input ADDRESS number 74 is not located by the Bi-polar network generator 75 a human educational input is required. This is done by a human educator who will supply the desired response 78 to the original input 72 for example by typing it 79 into the output network generator 77. The output network generator 77 will convert the educational input 79 into a single ADDRESS number 80 by a process described by "A Learning Network".

Note that the output network generator 77 must be able to both generate and retrieve patterns. The output ADDRESS number 80 is then supplied to the Bi-Polar network generator 75 which will create a new node as described under "Bi-Polar Networks".

This system can therewith be educated with an unlimited number of pre-learned answers to pre-learned questions. Every question or answer will be learned just once so that an almost complete repertoire is assembled after sometime. Note also that the answers and questions may be taught in any random order and that repeating patterns will not be stored again. A learning system is therewith obtained which absorbs knowledge automatically without conventional programming or supervision of its internal functioning from the human operator or educator. The system may be copied into an identical system by a conventional "memory dump". An interesting variation is the "knowledge dump" which consists of translating the nodes in the Bi-Polar network generator 75 backward through both the input network 81 and the output network 76. This should result in a dump of all the stored knowledge in a clear text format (written text) both for input 82 and output 78. Several of those "knowledge dump" copies from separate systems educated by separate human teachers could be merged into a single system by a process similar but automated as described for the education of this system. The system would reject all redundant education and expand only for new not previously learned inputs. The system memory requirement would expand only moderately but would be ultimately more "knowledgeable" than any of its human teachers. The storage, accumulation and merging of all human knowledge in unlimited reliable computers with easy access is seen as the major objective of this invention.

The described system can be fully symmetrical by exchanging input with output network function. Each of the separate networks could store ore retrieve patterns in any order.

A LANGUAGE TRANSLATION DEVICE

Figure 16:
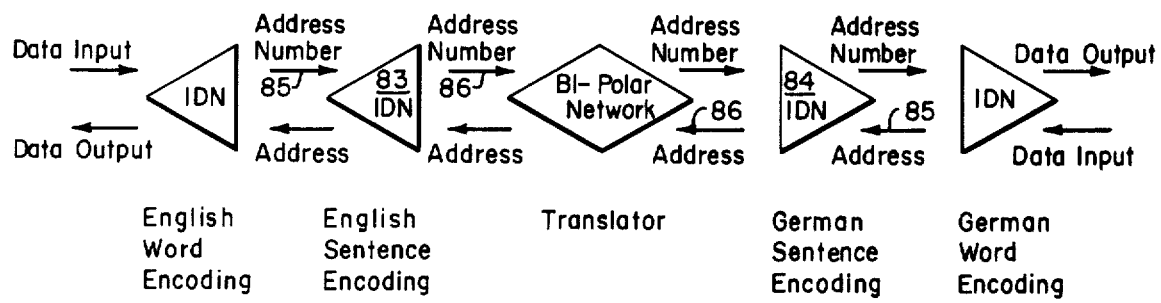
FIG. 16 is a view similar to FIGS. 14 and 15 but showing a language translation device.

This device as illustrated in FIG. 16 would function identically to the system described in "A Pattern Translation Device". The only variance consists of two additional network generators 83, 84 located in front and back of the Bi-polar network generator. The function of those two networks is to accept the ADDRESS number inputs 85 like input codes and convert them into a single output ADDRESS number 86 according to the operation described in "A Learning Network". The function may be seen if this system is used as a language translator. For example, an English sentence consisting of many words would first be converted into ADDRESS numbers one for each word. The word ADDRESS numbers 85 would then be accepted like input data by the next network 83, 84 which would convert it into a single ADDRESS number one for each complete English sentence. A further reduction in memory requirement is therewith realized. The device would be educated as described under "A Pattern Translation Device" and may be similarly copied or merged with other systems. It would function totally bi-directionally converting a pre-learned English sentence into a pre-learned German sentence and vice versa.

I claim:

1. A machine implemented method of conversion of a data sequence into a single address number of an addressable storage location in a storage region, comprising the steps of:

(a) providing a storage region having a plurality of machine addressable storage locations for storing machine readable data characters;

(b) directing the first data character of a data sequence and a starting number into respective first and second positions of a two-position, machine operable buffer region, the data character and the starting number, when received in respective positions of the buffer region, defining a machine readable input character matrix;

(c) machine addressing the storage locations of the storage region and machine reading the content of each storage location to determine if the input character matrix in the buffer region is stored in the storage region;

(d) if the input character matrix in the buffer region is not stored in said storage region, storing the input character matrix in a free storage location of said storage region and directing the address number of said free storage location into the second position of the buffer region;

(e) if the input character matrix in the buffer region is storage in a storage location of said storage region, directing the address number of the storage location at which the input character matrix is stored into the second position of the buffer region;

(f) directing the next data character of said data sequence into said first position of the buffer region to cause the next data character and the address number in respective positions of the buffer region to form another machine readable input character matrix;

(g) repeating steps c through f for each of the next and remaining data characters of the data sequence; and (h) terminating the repeating step after the input character matrix corresponding to the last data character of the data sequence has been stored or found to be stored in said storage region, the address number of the storage location which identifies the last input character matrix being operable to represent the data sequence.

2. A machine implemented method as set forth in claim 1, including retrieving, in reverse order, a data sequence stored in said storage region and represented by an address number, said address number identifying the storage location in the storage region at which the last character input matrix of the data sequence is stored, comprising the steps of:

(i) machine reading said last input character matrix from the storage region and directing it into the buffer region to present an output character matrix formed of a machine readable output data character and a machine readable, next address number, (j) machine reading the output data character in said buffer region and directing it to an output station.

(k) machine reading the input character matrix from the storage location of the storage region identified by the next address number and directing it into the buffer region to present another output character matrix, and (l) repeating steps j and k until the next address number is the starting number.

3. A machine implemented method of associating together a particular pair of related sets out of a group of sets, each set having a plurality of machine readable data sequences with the data sequences of each set capable of being stored in a plurality of addressable storage locations of a first storage region available, respectively, for each set, each set being represented by an identifying address number, the identifying address number of a set being the address number of the storage location in the respective first storage region corresponding to the last data sequence of the set, said method comprising:

(a) providing a second storage region having a plurality of machine addressable storage locations, each storage location of the second storage region having first and second positions for storing the respective identifying address numbers of each of a plurality of pairs of related sets of machine readable data sequences;

(b) directing the identifying address number of a selected set of data sequences into a first position of a two-position, machine operable buffer zone;

(c) machine addressing the storage locations of the second storage region and machine reading the identifying address numbers in the first positions of the storage locations thereof to find if the identifying address number of the selected set of data sequences is stored in the first position of a storage location of the second storage region;

(d) if the identifying address number of the selected set of data sequences is found in the first position of a storage location of the second storage region, machine reading the identifying address number in the second position of such storage location and using it to determine which other set of the group of sets is related to the selected set of data sequences;

(e) if the identifying address number of the selected set of data sequences is not found in the first position of a storage location of the second storage region, providing an identifying address number of a set of data sequences intended to be related to said selected set of data sequences, directing said identifying address number of the related set into the second position of the buffer zone, and storing the contents of the buffer zone in the first and second positions of a free storage location of said second storage region, whereby the selected set of data sequences will be associated with said set of data sequences intended to be related.

4. A machine implemented method as set forth in claim 3, wherein said step of providing the identifying address number of the related set of data sequences includes the following steps:

(f) determining the data sequences of the related set, (g) directing the first data sequence of the related set and a starting number into respective first and second positions of a two-position, machine operable buffer region to form an input matrix in the buffer region, (h) machine addressing the storage locations of the respective first storage region and machine reading the data sequence and address number in each storage location thereby to determine if the input matrix in the buffer region is stored in the respective first storage region, (i) if the input matrix in the buffer region is not stored in said respective first storage region, storing the input matrix in a free storage location of said respective first storage region and directing address number of the storage location into the second position of the buffer region;

(j) if the input matrix in the buffer region is stored in a storage location of said respective first storage region, directing the address number of the storage location at which the input matrix is stored into the second position of the buffer region;

(k) directing the next data sequence of said related set into said first position of the buffer region to cause the next data sequence and the address number in respective positions of the buffer region to form another input matrix;

(l) repeating steps h through k for each of the next and remaining data sequences of the related set; and (m) terminating the repeating step after the input matrix corresponding to the last data sequence of the related set has been stored in said respective first storage region, the address number of the storage location which identifies the last input matrix being the identifying address number of the related set.

5. A machine implemented method as set forth in claim 4, including the step of providing the identifying address number of the related set of data sequences in order to retrieve, in reverse order, the data sequences represented by said identifying address number of the related set, the data sequences being stored in a respective first storage region, said identifying address number of the related set identifying the storage location in the respective first storage region at which the last data sequence and a next address number are stored as a last input matrix, comprising the steps of:

(f) machine fetching said last input matrix from the respective first storage region and directing it into a buffer region to present an output matrix formed of a machine readable output data sequence and a machine readable next address number, (g) machine reading out the output data sequence in the buffer region and directing it to an output station, (h) machine reading the input matrix from the storage location of the respective first storage region identified by the next address number and directing it into the buffer region to present another output matrix, and (i) repeating steps g and h until the next address number is a starting number corresponding to the first data sequence.

6. A machine implemented method of converting a specific set of a group of sets of machine readable data sequences into a single output address number of a machine addressable storage location in a primary storage region, each data sequence of said specific set having a number of data characters capable of being stored in respective machine addressable storage locations of a data sequence storage region and each data sequence being identified by a machine readable identifying address number, each identifying address number identifying the storage location of the data sequence storage region at which the last data character of the respective data sequence is stored, said method comprising:

(a) providing a primary storage region having a plurality of machine addressable storage locations, the storage locations of the primary storage region being capable of storing respective identifying address numbers of a group of sets of data sequences;

(b) directing machine readable identifying address numbers of said specific set of data sequences into respective positions of a multiple-position, machine operable buffer zone to form an input matrix;

(c) machine addressing the storage locations of the primary storage region and machine reading the set of identifying address numbers in each storage location thereof to find if the input matrix is stored in a storage location of the primary storage region;

(d) if the input matrix is found to be stored in a storage location of the primary storage region, determining the address of the storage location of the primary storage region at which the input matrix is stored, the last-mentioned address being said single output address number of said specific set of data sequences; and (e) if the input matrix is found not to be stored in a storage location of the primary storage region, storing the input matrix in a free storage location of the primary storage region, the address number of the last-mentioned storage location being said single output address number of said specific set of data sequences.

7. A machine implemented method as set forth in claim 6, wherein is included the step of retrieving a set of data sequences identified by a respective single output address number of the primary storage region, comprising the steps of:

(f) machine reading the identifying address numbers from the respective storage location of the primary storage region represented by said respective single output address number, (g) directing the identifying address numbers to specific positions of a multiple-position buffer zone, and (h) reading out the identifying address numbers in the last-mentioned buffer zone to respective output stations to permit subsequent retrieval of the data characters of each data sequence from a respective data sequence storage region.

* * * * *